United States Patent
Kawaguchi et al.

(10) Patent No.: US 11,105,421 B2
(45) Date of Patent: Aug. 31, 2021

(54) CONTROL DEVICE FOR VEHICLE AND CONTROL METHOD FOR VEHICLE

(71) Applicants: JATCO Ltd, Fuji (JP); NISSAN MOTOR CO., LTD., Yokohama (JP)

(72) Inventors: Takateru Kawaguchi, Susono (JP); Fumitaka Nagashima, Fuji (JP); Hideharu Yamamoto, Odawara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 190 days.

(21) Appl. No.: 16/327,043

(22) PCT Filed: Oct. 17, 2017

(86) PCT No.: PCT/JP2017/037560
§ 371 (c)(1),
(2) Date: Feb. 21, 2019

(87) PCT Pub. No.: WO2018/079347
PCT Pub. Date: May 3, 2018

(65) Prior Publication Data
US 2019/0219167 A1      Jul. 18, 2019

(30) Foreign Application Priority Data

Oct. 26, 2016   (JP) .............................. JP2016-209453

(51) Int. Cl.
*F16H 63/42*     (2006.01)
*F16H 63/50*     (2006.01)
(Continued)

(52) U.S. Cl.
CPC ......... *F16H 63/42* (2013.01); *F02D 41/0215* (2013.01); *F16H 59/08* (2013.01);
(Continued)

(58) Field of Classification Search
CPC .......... F16H 63/42; F16H 59/08; F16H 61/02; F16H 63/50; F16H 59/38;
(Continued)

(56) References Cited

U.S. PATENT DOCUMENTS

2009/0055059 A1* 2/2009 Jerger .................... F16H 61/22
701/51
2011/0028270 A1* 2/2011 Long .................... F16H 59/045
477/62
(Continued)

FOREIGN PATENT DOCUMENTS

JP    H05-288267 A    11/1993
JP    2003-127845 A    5/2003
(Continued)

OTHER PUBLICATIONS

International Search Report re Application No. PCT/JP2017/037560; 4 pages.

*Primary Examiner* — Muhammad Shafi
(74) *Attorney, Agent, or Firm* — Foley & Lardner LLP

(57) ABSTRACT

A Controller constitutes a control device for a vehicle having an automatic transmission on which a shift-by-wire system is mounted. The controller changes display of an range indicator to N-range display after disengagement determination of an power transmission clutch is made when a shifting operation from a D range to a N range is performed.

8 Claims, 4 Drawing Sheets

(51) Int. Cl.
*F02D 41/02* (2006.01)
*F16H 59/08* (2006.01)
*F16H 61/02* (2006.01)
*F16H 59/38* (2006.01)

(52) U.S. Cl.
CPC ............. *F16H 61/02* (2013.01); *F16H 63/50* (2013.01); *F16H 59/38* (2013.01); *F16H 2059/385* (2013.01); *F16H 2063/423* (2013.01)

(58) Field of Classification Search
CPC ......... F16H 2063/423; F16H 2059/385; F16H 2061/0481; F02D 41/0215
USPC ............................................................ 701/36
See application file for complete search history.

(56) References Cited

U.S. PATENT DOCUMENTS

| | | | |
|---|---|---|---|
| 2013/0151096 A1* | 6/2013 | Fyie | F16H 59/08 |
| | | | 701/62 |
| 2013/0252785 A1* | 9/2013 | Kinoshita | B60W 30/18018 |
| | | | 477/97 |
| 2015/0337953 A1* | 11/2015 | Kasuya | B60T 1/06 |
| | | | 192/219.5 |
| 2018/0029577 A1* | 2/2018 | Beauvais | B60T 7/06 |
| 2018/0093669 A1* | 4/2018 | Khafagy | B60W 30/18054 |

FOREIGN PATENT DOCUMENTS

| | | | |
|---|---|---|---|
| JP | 2005090635 | | 4/2005 |
| JP | 2007032627 | | 2/2007 |
| JP | 2008303817 | | 12/2008 |
| JP | 2009-073416 | * | 2/2009 |
| JP | 2009-073416 | * | 4/2009 |
| JP | 2009-073416 A | | 4/2009 |

* cited by examiner

CONTROL DEVICE FOR VEHICLE AND CONTROL METHOD FOR VEHICLE

TECHNICAL FIELD

The present invention relates to a control device for a vehicle and a control method for a vehicle.

BACKGROUND ART

An automatic transmission on which a shift-by-wire system is mounted is known (see JP5-288267A, for example).

SUMMARY OF INVENTION

In the shift-by-wire system, range display of an indicator is made on the basis of a range signal. Thus, a driver determines a current range mainly on the basis of the range display of the indicator.

However, in a shifting operation performed by a driver from a running range to a neutral range, in a case of such a failure that an engagement element of the automatic transmission cannot be disengaged, if the indicator immediately makes neutral display, it causes a concern the following situation occurs in some cases. That is, in this case, there is a concern that such a situation that a vehicle moves regardless of the neutral display of the indicator occurs. As a result, there is a concern that recognition of the driver becomes different from a behavior of the vehicle.

The present invention was made in view of the aforementioned problem and has an object to provide a control device for a vehicle and a control method for a vehicle which can prevent the vehicle from moving regardless of the neutral display of the indicator when the shifting operation from the running range to the neutral range is performed.

A control device for a vehicle according to a certain aspect of the present invention is a control device for a vehicle having an automatic transmission on which a shift-by-wire system is mounted. The control device includes a control unit adapted to change display of an indicator to neutral display after disengagement determination of an engagement element of the automatic transmission is made when a shifting operation from a running range to a neutral range is performed.

According to another aspect of the present invention, a control method for a vehicle having an automatic transmission on which a shift-by-wire system is mounted is provided. The control method for the vehicle includes changing of display of an indicator to neutral display after disengagement determination of an engagement element of the automatic transmission is made when a shifting operation from a running range to a neutral range is performed.

According to these aspects, the display of the indicator is changed to the neutral display after disengagement determination of the engagement element of the automatic transmission is determined when the shifting operation is performed from the running range to the neutral range and thus, movement of the vehicle regardless of the neutral display of the indicator display can be prevented.

DESCRIPTION OF EMBODIMENTS

An embodiment of the present invention will be described below by referring to the attached drawings.

Figure 1:
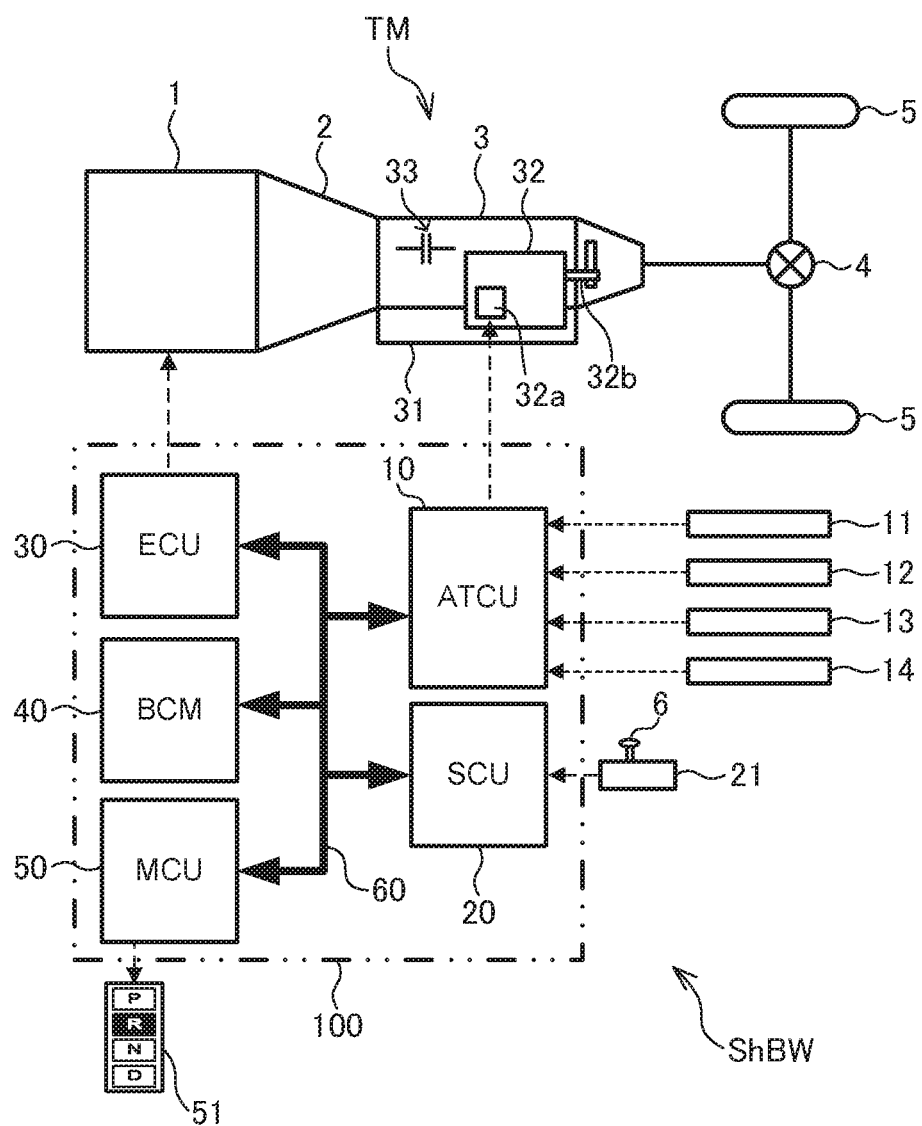
FIG. 1 is a schematic configuration diagram of a vehicle.

FIG. 1 is a schematic configuration diagram of a vehicle. The vehicle includes an engine 1 as a driving source. Power of the engine 1 is transmitted to a driving wheel 5 through an automatic transmission TM and a differential device 4.

The automatic transmission TM includes a torque converter 2 and a transmission mechanism 3. The automatic transmission TM has a drive (D) range, a reverse (R) range, a neutral (N) range, a parking (P) range and the like as the ranges and can set any one of them as a set range. The D range and the R range constitute running ranges, and the N range and the P range constitute a non-running range.

The automatic transmission TM specifically has a constitution that a shift-by-wire system ShBW is mounted. The shifter-by-wire system ShBW is constituted by having a shifter 6 and a shift position sensor 21.

For the shifter 6 of the automatic transmission TM, a momentary shifter which automatically returns to a neutral position HOME which is an initial position after the operation is used. The set range of the automatic transmission TM is set by operation of the shifter 6 by the driver. Which range was selected by the shifter 6 is detected by the shifter position sensor 21. The shifter 6 is specifically a shift lever but may be a shift switch or the like. The shift-by-wire system ShBW is constituted further by having the transmission mechanism 3, an ATCU 10, an SCU 20, an MCU 50, a range indicator 51 and the like.

The transmission mechanism 3 is a stepped automatic transmission mechanism and is constituted by having a planetary gear mechanism and a plurality of friction engaging elements. The transmission mechanism 3 can switch a gear ratio and forward driving/reverse driving by changing an engagement state of the plurality of friction engaging elements. In the following description, a clutch and a brake engaged when the set range of the automatic transmission TM is set to the running range are collectively called a power transmission clutch 33.

The transmission mechanism 3 is constituted by further having a control valve unit 31 and a park module 32. The control valve unit 31 is constituted by having a plurality of solenoid valves adapted to control an operating oil pressure of the plurality of friction engaging elements of the transmission mechanism 3.

The park module 32 mechanically locks an output shaft of the transmission mechanism 3 during parking. When the set range of the automatic transmission TM is set to the P range, a park rod 32b is driven by an actuator 32a to a lock position. As a result, an engagement claw, not shown, is engaged with a park gear, not shown, provided on the output shaft of the transmission mechanism 3, and the output shaft of the transmission mechanism 3 is mechanically locked (park lock state). On the other hand, when the set range of the automatic transmission TM is set to a range other than the P range, the park rod 32b is driven by the actuator 32a to an unlock position. As a result, the engagement between the engagement claw, not shown, and the park gear is disengaged, and the lock of the output shaft of the transmission mechanism 3 is disengaged (park lock unlocked state).

The ATCU 10 is a control unit of the automatic transmission TM and executes control of the automatic transmission TM. Into the ATCU 10, signals from an accelerator pedal opening sensor 11 adapted to detect an accelerator pedal opening APO which is an operation amount of an accelerator pedal, a vehicle speed sensor 12 adapted to detect a vehicle speed VSP, a parking position sensor 13 adapted to detect a position of the park rod 32*b* of the park module 32, a rotation speed sensor 14 adapted to detect a turbine rotation speed Ntbn of the torque converter 2 and the like are input.

The ATCU 10 is connected to the SCU 20, an ECU 30, a BCM 40, and the MCU 50 through a CAN 60, capable of communication.

The SCU 20 is a shift control unit. The SCU 20 generates a request range signal corresponding to the range selected by the shifter 6 and outputs it to the ATCU 10 on the basis of the signal from the shifter position sensor 21.

The ATCU 10 sets a set range of the automatic transmission TM on the basis of the request range signal from the SCU 20. The ATCU 10 outputs a control command value to the control valve unit 31 as will be described subsequently in accordance with the set range of the automatic transmission TM.

When the range of the automatic transmission TM is set to the D range, the ATCU 10 determines a target gear position by referring to a shift map on the basis of a vehicle speed VSP and an accelerator pedal opening APO and outputs the control command value for achieving the target gear position to the control valve unit 31. As a result, a plurality of solenoid valves is controlled in accordance with the control command value, operation oil pressures of a plurality of the friction engaging elements are adjusted, and the target gear position is achieved.

When the set range of the automatic transmission TM is set to the R range, the ATCU 10 executes R-range control. The R-range control is shift control of the automatic transmission TM executed in accordance with selection of the R range and control for achieving a reverse position. In the R-range control, the target gear position is determined to be a reverse position, and a control command value for achieving the target gear position is output to the control valve unit 31. In this case, a plurality of the solenoid valves is controlled so as to achieve the reverse position.

When the set range of the automatic transmission TM is set to the P range or to the N range, the ATCU 10 outputs a control command value for causing the power transmission clutch 33 to be disengaged to the control valve unit 31. When the set range is P range, moreover, the ATCU 10 causes the actuator 32*a* of the park module 32 to be operated and brings the automatic transmission TM to the park lock state.

The ECU 30 is an engine control unit and controls the engine 1. The ECU 30 outputs a rotation speed NE of the engine 1, a throttle opening TVO and the like to the ATCU 10.

The BCM 40 is a body control module and controls a vehicle body side operation element. The vehicle body side operation element is a door lock mechanism of the vehicle and the like and includes a starter of the engine 1. The BCM 40 outputs an ON/OFF signal of a door lock switch adapted to detect a door lock of the vehicle, an ON/OFF signal of an ignition switch of the engine 1 and the like to the ATCU 10.

The MCU 50 is a meter control unit and controls meters, an alarm lamp, a display, a range indicator 51 displaying the set range of the automatic transmission TM and the like provided in a cabin.

The ATCU 10, the SCU 20, the ECU 30, the BCM 40, and the MCU 50 constitute a controller 100 which is a control device of the vehicle in this embodiment.

In the shift-by-wire system ShBW, the range display of the range indicator 51 is performed on the basis of a range signal or more specifically, a set range signal input from the ATCU 10 and indicating the set range. Thus, the driver determines a current range on the basis mainly of the range display of the range indicator 51.

However, in the case where a disengagement failure that the power transmission clutch 33 cannot be disengaged occurs in the shifting operation by the driver from the D range or the R range to the N range, if the range indicator 51 is immediately changed to the neutral display, that is, the N-range display, there is a concern that the following situation occurs.

That is, in this case, there is a concern that the situation that the vehicle moves occurs regardless of the N-range display of the range indicator 51. As a result, there is a concern that recognition of the driver becomes different from the behavior of the vehicle. Particularly, if the shifter 6 is used for returning to the initial position after the shifting operation, for a portion by which the driver depends more on the range indicator 51, the recognition of the driver becomes different from the behavior of the vehicle easily.

In view of these circumstances, the controller 100 executes control which will be described subsequently in this embodiment.

Figure 2:
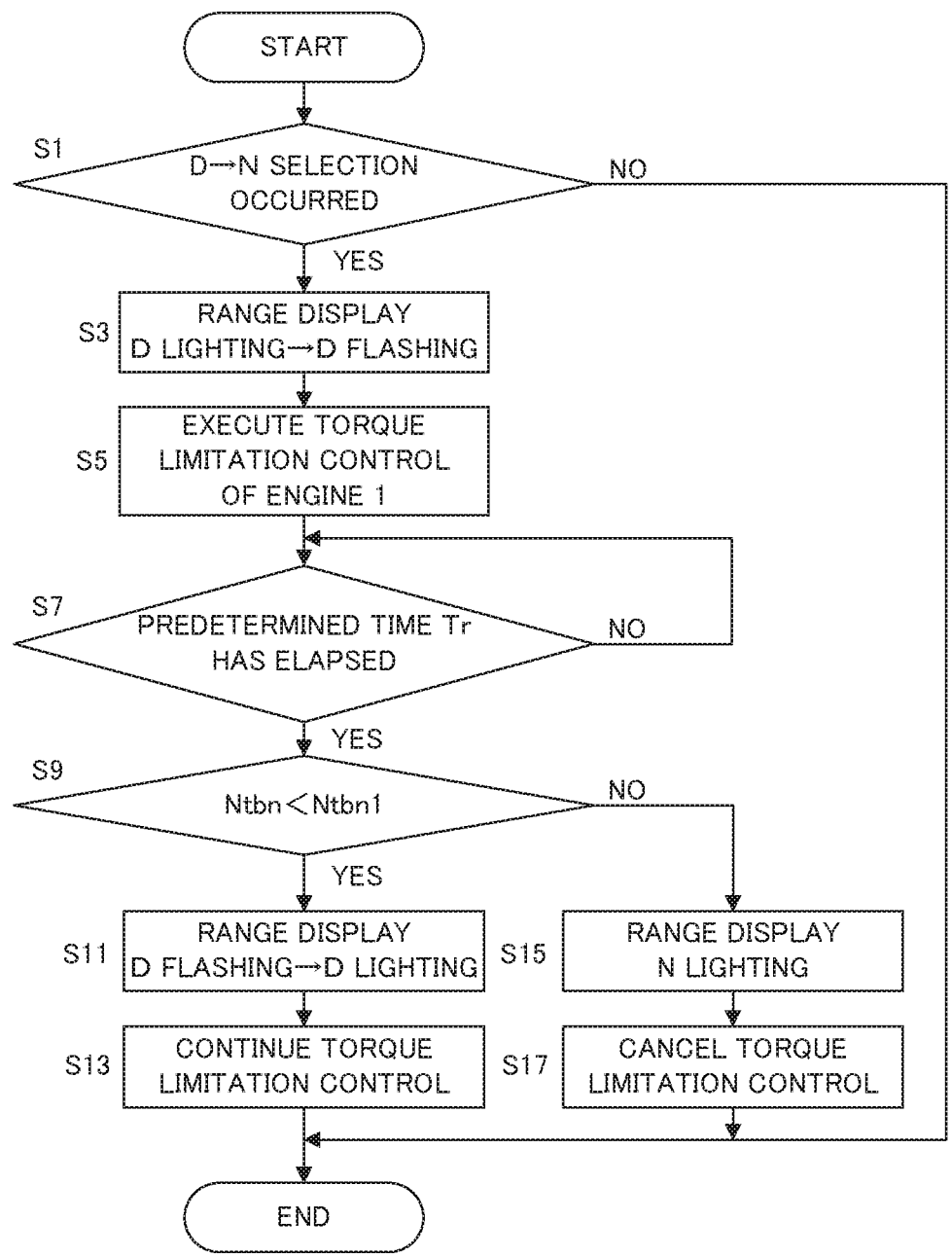
FIG. 2 is a diagram illustrating an example of control of an embodiment in a flowchart.

FIG. 2 is a diagram explaining an example of the control executed by the controller 100 in a flowchart. At Step S1, the controller 100 determines whether an N-range selection from the D range has occurred or not, that is, whether a shifting operation from the D range to the N range has been performed or not. Processing at Step S1 can be performed by the ATCU 10 on the basis of the request range signal from the SCU 20. In the case of negative determination at Step S1, the processing is finished once. In the case of affirmative determination at Step S1, the processing goes on to Step S3.

At Step S3, the controller 100 changes the range display of the range indicator 51 from lighting display of the D range to flashing display of the D range. The lighting display of the D range is the D-range display indicating that the set range is the D range. The flashing display of the D range is request received display indicating that a request by the driver through the shifting operation has been received and is different from the D-range display in a point that it does not indicate that the set range is the D range. Processing at Step S3 can be performed by the MCU 50 on the basis of the determination result at Step S1, for example.

At Step S5, the controller 100 executes torque limitation control of the engine 1. The torque limitation control is torque limitation control at the N-range selection, whereby a torque of the engine 1 is not to be increased even if the accelerator pedal is stepped on by the driver.

Such torque limitation control is executed by decreasing the torque of the engine 1 by a torque-down request value Treq. The torque-down request value Treq can be set to a value which does not increase the torque of the engine 1 in accordance with an acceleration request. Processing at Step S5 can be executed by the ECU 30 on the basis of the determination result at Step S1, for example.

At Step S7, the controller 100 determines whether predetermined time Tr has elapsed or not since the shifting operation from the D range to the N range was performed. The predetermined time Tr is time required until the power transmission clutch 33 is disengaged since the shifting operation was performed and is set to a maximum value of such time in normal time, for example. The predetermined time Tr can be set in advance by an experiment or the like. Processing at Step S7 can be executed by the ATCU 10, for example. If it is negative determination at Step S7, the processing at Step S7 is repeated, while if it is affirmative determination at Step S7, the processing goes on to Step S9.

At Step S9, the controller 100 determines whether the turbine rotation speed Ntbn of the torque converter 2 is lower than a neutral determination value Ntbn1 or not.

Here, if the vehicle is stopped, for example, rotation of the driving wheel 5 is also stopped. At this time, if the power transmission clutch 33 is connected by the automatic transmission TM, the turbine rotation speed Ntbn becomes zero, depending on the rotation speed of the driving wheel 5.

In this state, the power transmission clutch 33 is controlled to the disengaging direction in accordance with the shifting operation from the D range to the N range. In accordance with that, when the power transmission clutch 33 begins to be disengaged and is brought into a slip state, the turbine rotation speed Ntbn begins to rise in accordance with the rotation speed NE of the engine 1. The power transmission clutch 33 is disengaged via the slip state where the turbine rotation speed Ntbn rises as above.

Thus, if the turbine rotation speed Ntbn is lower than the neutral determination value Ntbn1 after elapse of the predetermined time Tr, the power transmission clutch 33 is not disengaged, and it can be determined that a failure that disengagement is not possible has occurred.

On the contrary, if the turbine rotation speed Ntbn is not smaller than the neutral determination value Ntbn1 after the elapse of the predetermined time Tr, it can be determined that the power transmission clutch 33 is disengaged and the automatic transmission TM is brought into the neutral state.

That is, the neutral determination value Ntbn1 is a determination value for determining whether the power transmission clutch 33 is disengaged and the automatic transmission TM is brought into the neutral state or not and can be set in advance by an experiment or the like. The processing at Step S9 can be executed by the ATCU 10, for example. If it is affirmative determination at Step S9, it is determined that the failure that disengagement is not possible has occurred, and the processing goes on to Step S11.

At Step S11, the controller 100 changes the range display from the flashing display of the D range to the lighting display of the D range. The lighting display of the D range from the flashing of the D range means that the automatic transmission TM has not become the N range against the request of the driver by the shifting operation. The processing at Step S11 can be executed by the MCU 50 on the basis of the determination result at Step S9, for example.

At Step S13, the controller 100 continues the torque limitation control of the engine 1. As a result, even if the driver who performed the shifting operation in a situation where the failure that disengagement is not possible has occurred steps on the accelerator pedal, rapid acceleration of the vehicle is prevented. After Step S13, the processing is finished once.

In the case of the negative determination at Step S9, disengagement determination of the power transmission clutch 33 is made. That is, it is determined that the power transmission clutch 33 is disengaged. In this case, the processing goes on to Step S15.

At Step S15, the controller 100 changes the range display to the lighting display of the N range. Moreover, at Step S17, the controller 100 cancels the torque limitation control. After Step S17, the processing is finished once.

Figure 3:
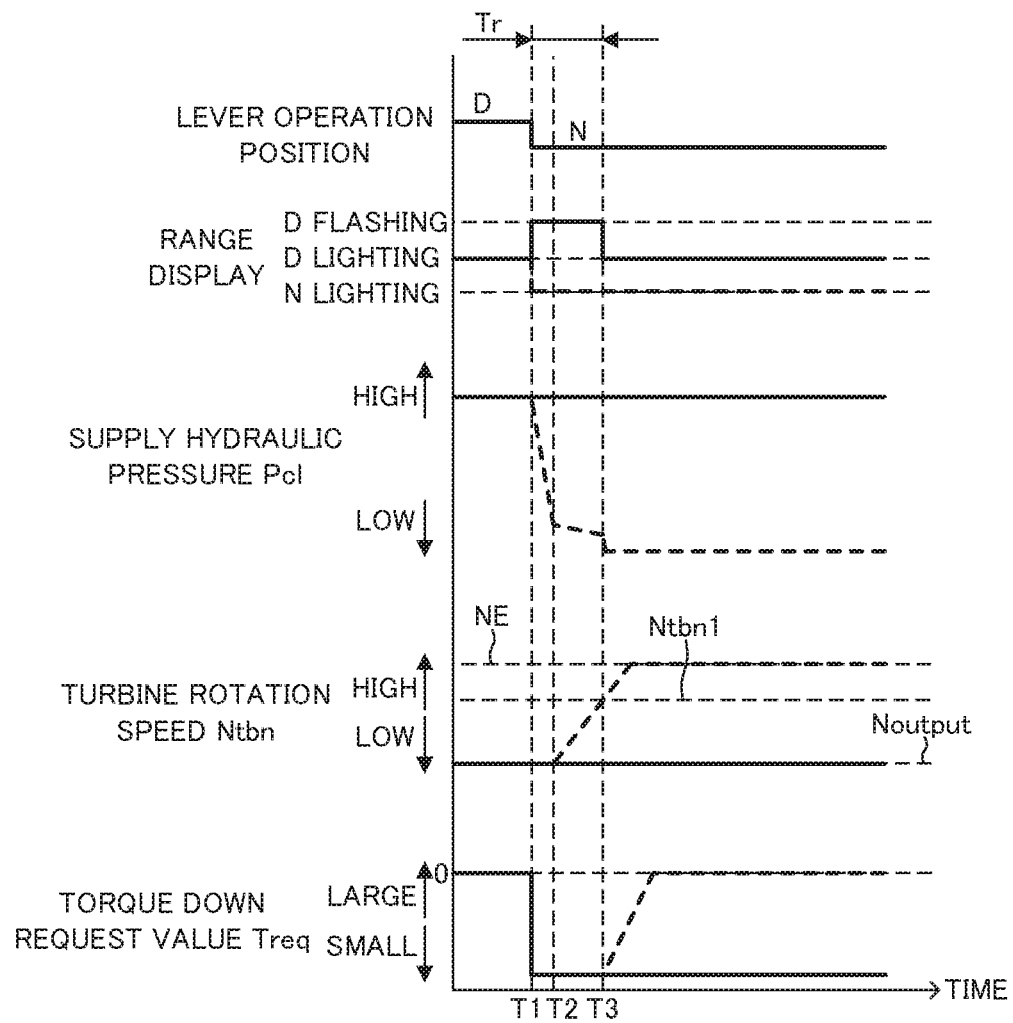
FIG. 3 is a diagram illustrating an example of a timing chart corresponding to the control of the embodiment.

FIG. 3 is a diagram illustrating an example of a timing chart corresponding to the control illustrated in FIG. 2. A broken line indicates a comparative example. In the comparative example, a change in normal time of the power transmission clutch 33 is illustrated. The torque-down request value Treq indicates a torque for a decrease in the torque limitation control of the engine 1 and is set to a value not larger than zero. The torque-down request value Treq indicates that the torque is largely decreased as a negative value becomes larger. An output-side rotation speed Noutput indicates a rotation speed input from the driving wheel 5 side into the torque converter 2.

At timing T1, the shifting operation from the D range to the N range is performed. In the comparative example, a supply hydraulic pressure Pc1 to the power transmission clutch 33 is lowered by that, and the power transmission clutch 33 is controlled in the disengaging direction. Thus, there is no hindrance even if the range display is changed to the N-range display. In the comparative example, too, the torque limitation control is started at the timing T1.

In the comparative example, the power transmission clutch 33 begins to be disengaged and the slip state is brought about at timing T2. As a result, the turbine rotation speed Ntbn begins to rise. The turbine rotation speed Ntbn becomes the rotation speed NE of the engine 1 in the end.

In the comparative example, at timing T3 when the predetermined time Tr has elapsed since the timing T1, the power transmission clutch 33 which has been in the slip state is disengaged. At the timing T3, the torque limitation control is also canceled. The cancellation of the torque limitation control is made by gradually making an absolute value of the torque-down request value Treq small.

When the failure that disengagement is not possible occurs, even if the shifting operation is performed at the timing T1, the supply hydraulic pressure Pc1 is not lowered. In this case, if the range display is changed to the N-range display as in the comparative example, though the automatic transmission TM is actually still in a state according to the D range, the driver would erroneously recognize that the neutral state is brought about.

In this embodiment, when the shifting operation is performed at the timing T1, the range display is changed from the lighting display of the D range to the flashing display. As a result, the fact that the driver's request through the shifting operation has been received is notified, and if the failure that disengagement is not possible occurs, the driver is prevented from erroneously recognizing that the automatic transmission TM has been brought into the neutral state.

If the failure that disengagement is not possible occurs, the turbine rotation speed Ntbn depends on the output-side rotation speed Noutput. Thus, in this case, the turbine rotation speed Ntbn stays at the output-side rotation speed Noutput at the timing T2 and after.

In this embodiment, disengagement determination of the power transmission clutch 33 is made at the timing T3 when the predetermined time Tr has elapsed since the timing T1. At the timing T3, the turbine rotation speed Ntbn is lower than the neutral determination value Ntbn1.

Thus, at the timing T3, it is determined that the failure that disengagement is not possible has occurred, and the range display is changed from the flashing display of the D range to the lighting display of the D range. Moreover, the torque limitation control remains to be continued. As a result, the driver is prevented from erroneously recognizing the state of the automatic transmission TM, and even if the driver steps on the accelerator pedal, rapid acceleration of the vehicle is prevented.

Subsequently, major working effects of this embodiment will be described.

The controller 100 constitutes a control device of the vehicle having the automatic transmission TM on which the shift-by-wire system ShBW is mounted. The controller 100 changes the display of the range indicator 51 to the N-range display after the disengagement determination of the power transmission clutch 33 is made when the shifting operation from the D range to the N range is performed.

Specifically, the controller 100 is constituted to execute the processing at Step S15 after the affirmative determination at Step S1 and the negative determination at Step S9 in the flowchart illustrated in the aforementioned FIG. 2 and it is constituted by having a control unit adapted to make such a change.

According to such constitution, when the shifting operation from the D range to the N range is performed, the display of the range indicator 51 is changed to the N-range display after the disengagement determination of the power transmission clutch 33 is made and thus, the vehicle can be prevented from moving regardless of the N-range display of the display of the range indicator 51.

Particularly, when the shifter 6 adapted to return to the initial position after the shifting operation is used, dependence on the range indicator 51 of the driver becomes high. Thus, by preventing the vehicle from moving by the N-range display, a merit that the behavior of the vehicle different from the recognition of the driver is prevented from occurring is high.

If the disengagement determination of the power transmission clutch 33 is not made even after the predetermined time Tr has elapsed since the shifting operation from the D range to the N range was performed, the controller 100 makes the display of the range indicator 51 the D-range display.

Specifically, the controller 100 is constituted to execute the processing at Step S11 when the affirmative determination is made at Step S9 after the affirmative determination at Step S1 and the affirmative determination at Step S7, and the control unit is further constituted to make such display.

According to such constitution, even if the disengagement determination is not made regardless of the shifting oration from the D range to the N range, the display of the range indicator 51 can be matched with the state of the automatic transmission TM. Thus, deviation of an actual state from the display can be eliminated.

In this embodiment, the vehicle has the engine 1 connected to the input side of the automatic transmission TM. The controller 100 executes the torque limitation control of the engine 1 until the disengagement determination of the power transmission clutch 33 is made.

Specifically, the controller 100 is constituted to execute the processing at Step S17 after the processing at Step S5 is executed and then, the affirmative determination at Step S7 and the negative determination at Step S9, and the control unit is further constituted to execute the torque limitation control until the disengagement determination is made.

According to such constitution, if the failure that disengagement is not possible occurs when the shifting operation from the D range to the N range is performed, rapid acceleration of the vehicle can be prevented in a situation that the driver steps on the accelerator pedal.

The controller 100 may be constituted so as to execute control which will be described below.

Figure 4:
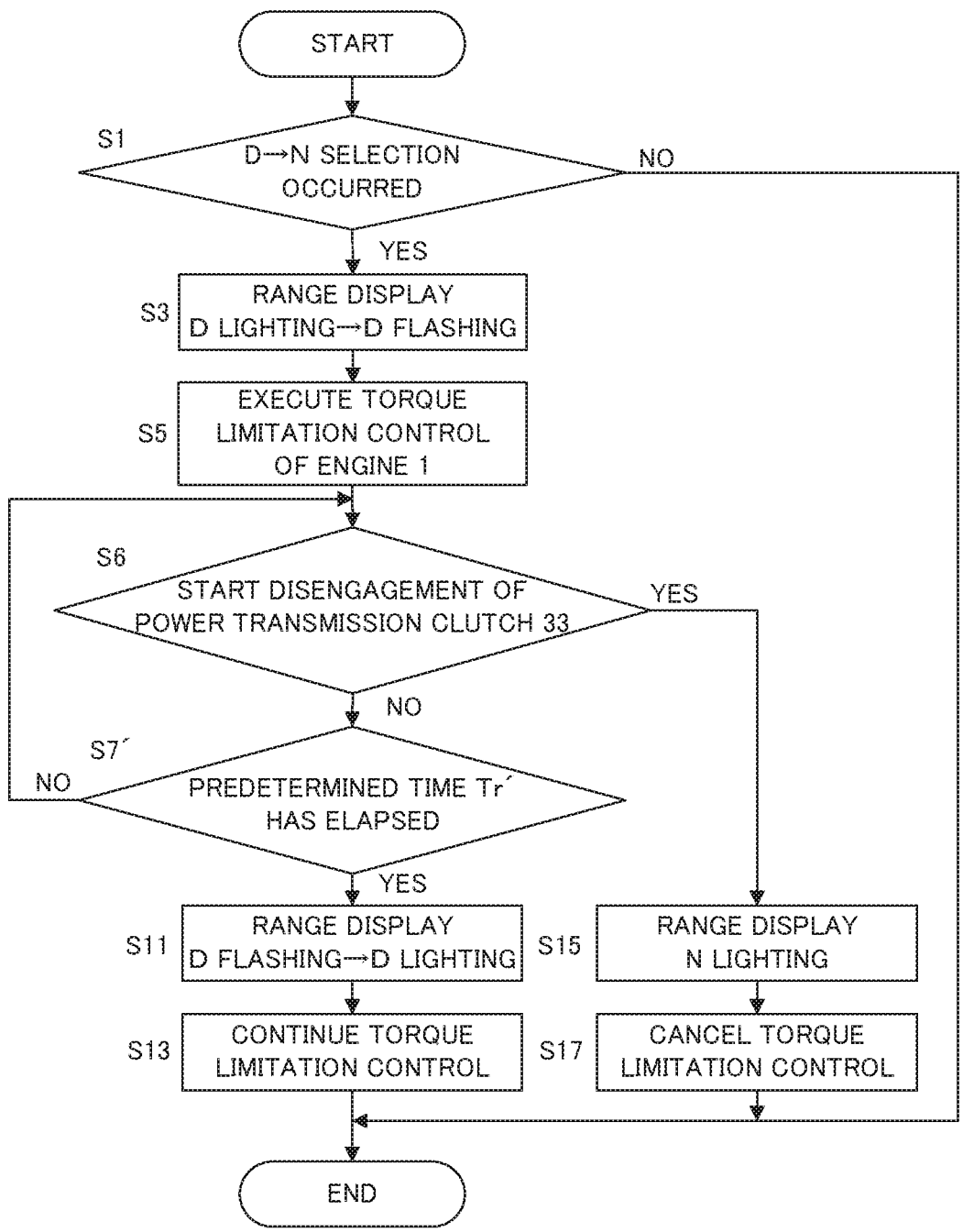
FIG. 4 is a diagram illustrating an example of control of a variation in a flowchart.

FIG. 4 is a diagram illustrating a variation of control executed by the controller 100 in a flowchart. The flowchart illustrated in FIG. 4 is the same as the flowchart illustrated in FIG. 2, except that Step S9 is not provided, Step S6 is provided subsequently to Step S5, and Step S7' is provided instead of Step S7. Thus, particularly they will be described here.

At Step S6, the controller 100 determines whether the disengagement of the power transmission clutch 33 has started or not. Such determination can be made by determining whether the turbine rotation speed Ntbn has exceeded a disengagement start determination value Ntbn2 or not, for example. The disengagement start determination value Ntbn2 can be set to a rotation speed higher than the turbine rotation speed Ntbn in the case where the shifting operation from the D range to the N range is performed by a predetermined value α, for example. The predetermined value α can be set in advance by an experiment or the like.

The determination at Step S6 may be determined on whether the supply hydraulic pressure Pd to the power transmission clutch 33 has fallen below a disengagement start determination value Pc11 as to the supply hydraulic pressure Pc1 or not. The disengagement start determination value Pc11 can be set to a hydraulic pressure lower than the supply hydraulic pressure Pd in the case where the shifting operation from the D range to the N range is performed by a predetermined value β, for example. The predetermined value β can be set in advance by an experiment or the like.

In the case of affirmative determination at Step S6, the processing goes on to Step S15. That is, in this example, the disengagement of the power transmission clutch 33 is started, thus the disengagement determination of the power transmission clutch 33 is made, and the range display is changed to the lighting display of the N range.

In the case of the negative determination at Step S6, the processing goes on to Step S7', and the controller 100 determines whether predetermined time Tr' has elapsed since the shifting operation from the D range to the N range was performed or not. The predetermined time Tr' is time required until the disengagement of the power transmission clutch 33 is started since the shifting operation was performed, and is set to a maximum value of such time in normal time, for example.

In the case of the negative determination at Step S7', the processing returns to Step S6. That is, if the disengagement determination is not made, it is determined whether the disengagement of the power transmission clutch 33 has started or not until the predetermined time Tr' has elapsed in this example. Then, in the case of the affirmative determination at Step S7', it is determined that the failure that disengagement is not possible occurs, and the processing goes on to Step S11.

According to such variation, the disengagement determination of the power transmission clutch 33 is determination which shows that the disengagement of the power transmission clutch 33 begins to be performed. When a change to the neutral begins to occur after the shifting operation to the N range, the change to the neutral after that is substantially certain and thus, according to such variation, a display response of the range indicator 51 according to the shifting operation can be improved while occurrence of a vehicle behavior different from recognition of the driver is prevented.

The embodiment of the present invention has been described above, but the aforementioned embodiment illustrates only a part of an application example of the present invention and is not intended to limit a technical scope of the present invention to the specific constitution of the aforementioned embodiment.

In the aforementioned embodiment, the case where the running range is set to the D range and the N-range selection from the D range is made was described. However, the running range may be the R range, for example.

In the aforementioned embodiment, the case where the controller 100 is constituted to have a control unit was described. However, the control unit may be a portion functionally grasped as constitution that the controller has as the result of functional realization by a single controller, for example.

In the aforementioned embodiment, the case where the automatic transmission TM is a stepped automatic transmission was described. However, the automatic transmission TM may be a continuously variable transmission, for example.

The present application claims a priority based on Japanese Patent Application No. 2016-209453 filed with the Japan Patent Office on Oct. 26, 2016, all the contents of which are hereby incorporated by reference.

The invention claimed is:

1. A control device for a vehicle having an automatic transmission on which a shift-by-wire system is mounted, comprising:
   a controller adapted to change a display of an indicator to a neutral display after a disengagement determination of an engagement element of the automatic transmission is made when a shifting operation from a running range to a neutral range is performed, wherein
   the disengagement determination is a determination that the disengagement of the engagement element actually begins to be performed.

2. The control device for a vehicle according to claim 1, wherein
   the controller makes the display of the indicator the running range display if the disengagement determination is not made even after predetermined time has elapsed since the shifting operation from the running range to the neutral range is performed.

3. The control device for a vehicle according to claim 1, wherein
   the vehicle has a driving source connected to an input side of the automatic transmission; and
   the controller executes a torque limitation control of the driving source until the disengagement determination is made.

4. A control device for a vehicle having an automatic transmission on which a shift-by-wire system is mounted, comprising:
   a controller adapted to change a display of an indicator to a neutral display after a disengagement determination of an engagement element of the automatic transmission is made when a shifting operation from a running range to a neutral range is performed, wherein
   the controller makes the disengagement determination on the basis of a turbine rotation speed of a torque converter.

5. The control device for a vehicle according to claim 4, wherein
   the controller makes the display of the indicator the running range display if the disengagement determination is not made even after predetermined time has elapsed since the shifting operation from the running range to the neutral range is performed.

6. The control device for a vehicle according to claim 4, wherein
   the vehicle has a driving source connected to an input side of the automatic transmission; and
   the controller executes a torque limitation control of the driving source until the disengagement determination is made.

7. A control method for a vehicle having an automatic transmission on which a shift-by wire system is mounted, comprising:
   changing a display of an indicator to a neutral display after a disengagement determination of an engagement element of the automatic transmission is made when a shifting operation from a running range to a neutral range is performed, wherein
   the disengagement determination is a determination that the engagement element is actually disengaged and the automatic transmission is brought into a neutral state or a determination that the disengagement of the engagement element actually begins to be performed.

8. A control method for a vehicle having an automatic transmission on which a shift-by-wire system is mounted, comprising:
   changing a display of an indicator to a neutral display after a disengagement determination of an engagement element of the automatic transmission is made when a shifting operation from a running range to a neutral range is performed, wherein
   when the disengagement determination is made, the disengagement determination is made on the basis of a turbine rotation speed of a torque converter.

* * * * *